(12) United States Patent
Rivin

(10) Patent No.: US 7,993,598 B2
(45) Date of Patent: Aug. 9, 2011

(54) CATALYTIC REACTORS

(76) Inventor: Evgeny I. Rivin, West Broomfield, MI (US)

( * ) Notice: Subject to any disclaimer, the term of this patent is extended or adjusted under 35 U.S.C. 154(b) by 757 days.

(21) Appl. No.: 10/278,384

(22) Filed: Oct. 23, 2002

(65) Prior Publication Data

US 2003/0086834 A1 May 8, 2003

Related U.S. Application Data

(60) Provisional application No. 60/334,750, filed on Oct. 31, 2001.

(51) Int. Cl.
*B01J 19/08* (2006.01)
(52) U.S. Cl. .................................. 422/186.04; 422/180
(58) Field of Classification Search ............. 422/186.04, 422/180
See application file for complete search history.

(56) References Cited

U.S. PATENT DOCUMENTS

| 4,279,722 | A | * | 7/1981 | Kirkbride | 204/157.15 |
|---|---|---|---|---|---|
| 4,628,834 | A | * | 12/1986 | McKelvie | 110/263 |
| 4,762,093 | A | * | 8/1988 | McCabe et al. | 123/3 |
| H675 | H | * | 9/1989 | Wortman et al. | 436/152 |
| 5,500,371 | A | * | 3/1996 | Gleaves | 436/37 |
| 5,884,139 | A | * | 3/1999 | Roussy et al. | 422/186 |
| 6,077,400 | A | * | 6/2000 | Kartchner | 204/157.15 |
| 6,241,826 | B1 | * | 6/2001 | Dittmer et al. | 134/1 |
| 6,632,332 | B1 | * | 10/2003 | Takaki | 204/155 |
| 2004/0007292 | A1 | * | 1/2004 | Fujita et al. | 148/238 |

* cited by examiner

*Primary Examiner* — N. Bhat
(74) *Attorney, Agent, or Firm* — Gifford, Krass, Sprinkle, Anderson & Citkowski, P.C.

(57) ABSTRACT

It is suggested to apply mechanical vibratory motions to the interface area between catalyst and the reacting substances in a catalytic reactor in order to intensify flow intensity as well as reaction intensity between the reacting substances.

12 Claims, 1 Drawing Sheet

CATALYTIC REACTORS

Priority for this application is requested to be Oct. 31, 2001 per Provisional U.S. patent application Ser. No. 60/334,750 filed Oct. 31, 2001.

FIELD OF THE INVENTION

The present invention relates to catalytic reactors such as ones employed in fuel cells, automotive catalytic converters, fuel reformers, etc.

BACKGROUND OF THE INVENTION

Catalytic reactors allow to enhance intensity of chemical reactions, to reduce required temperatures and pressures in the reaction areas, to perform otherwise impossible reactions, etc. The representative examples of catalytic reactors are fuel cells, automotive catalytic converters, metal-air batteries, fuel reformers.

The reacting substances are usually fluids and gases which must come into contact with the catalytic material (catalyst) for it to perform its catalytic function. Therefore, in order to improve performance of the catalytic reactors, the effective contact surface of the catalyst has to be increased and/or the flow of the reacting substances contacting with the catalyst surface has to be intensified.

A straightforward increase of the contact surfaces results in unacceptable large sizes of the reactors and in a need for large amounts of the expensive catalytic materials. As a result, in many cases catalytic reactors employ supporting structures having a multiplicity of small cross sectional area passages (capillary and/or porous) whose surfaces are embedded with numerous minute particles of the catalyst. This arrangement increases effective contact surface area while maintaining a reasonable size. However, such an arrangement increases resistance to flow through the catalytic reactor. The increased flow resistance results in increasing back pressure (thus, loss of power) in automotive catalytic converter applications or in the need to increase sizes of the passages (thus, the size of the reactor), and/or size, cost, and energy consumption of the auxiliary pumps, e.g. in fuel cells.

This invention, as described and claimed below, is aimed for elimination of the above-quoted shortcomings of the catalytic reactors.

SUMMARY OF THE INVENTION

It is suggested to improve performance characteristics of catalytic reactors by application of mechanical vibratory field to the reaction area.

It is suggested to generate traveling waves in parts of the catalyst-supporting structure.

It is suggested to apply mechanical, preferably ultrasonic, vibrations to the catalyst-supporting structure in the direction of the flow of the reacting substances.

It is suggested to apply mechanical, preferably ultrasonic, vibrations to the catalyst-supporting structure in the direction perpendicular to the direction of the flow of the reacting substances.

It is suggested to apply mechanical, preferably ultrasonic, vibrations to the catalyst-supporting structure in the direction at an angle to the direction of the flow of the reacting substances.

It is suggested to generate mechanical, preferably ultrasonic, vibrations of the flow of at least one of the reacting substances before its entrance into the catalytic reactor.

BRIEF DESCRIPTION OF THE DRAWINGS

The present invention can best be understood with reference to the following detailed description and drawings, in which.

DETAILED DESCRIPTION OF THE PREFERRED EMBODIMENTS

While it would be appreciated by those skilled in the art that catalytic reactors may have various designs/embodiments, some concepts of the present invention will be described on the example of a single tubular passage whose internal surface has catalytic properties with an understanding that the proposed techniques and concepts can be fully applied to other designs of catalytic reactors after appropriate and obvious design changes while using the described concepts.

Figure 1:
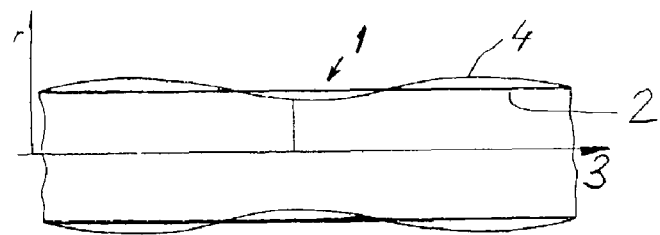
FIG. 1 illustrates waves traveling along the walls of a tubular catalytic reactor.

FIG. 1 represents a longitudinal section of tube 1 whose internal surface 2 is coated with a catalytic material. The coating is not explicitly shown and can comprise a continuous layer of the catalytic material or fine particles attached to or embedded into surface 2. The cross sectional shape of tube 2 is arbitrary. Walls of tube 1 are vibrating in the direction perpendicular to the tube axis as shown in FIG. 1 (in the radial direction r, even if the tube is not round). If the vibratory pattern 4 shown in FIG. 1 is moving in the direction of arrow 3, the vibratory condition is called a "traveling wave" along the walls of a passage accommodating a gas or fluid flow. This condition can be fully characterized by the frequency and amplitude of vibration and by the velocity of the axial "travel" of the vibratory pattern.

A flow of fluid or gas within a tubular passage is characterized by very low (or zero) velocity of the moving medium next to the wall of the tubular passage, especially for the laminar flow. However, the flow in a tube undergoing the traveling wave vibration as shown in FIG. 1 has much higher velocities (up to one-to-two decimal orders of magnitude) next to the wall. In the same time, velocity magnitudes in the central area of the tubular passage (where the flow velocities are the greatest) are not changing to a significant degree. Although this effect is less pronounced for turbulent flows, it still can be significant. Obviously, such an effect is optimal for a tubular catalytic reactor.

Figure 2:
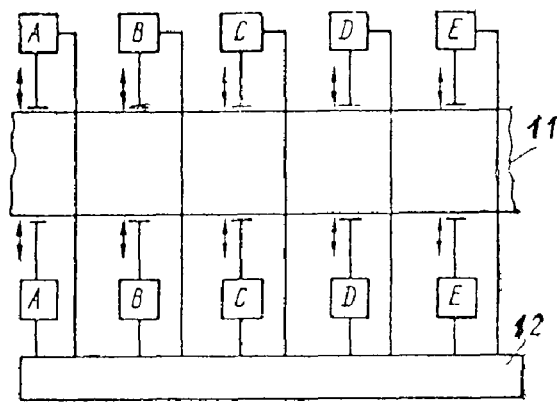
FIG. 2 gives a schematic of a setup for generating traveling waves in a tubular catalytic reactor.

This effect is pronounced even at low vibration frequencies, as low as single digit Hz. It can be realized by attaching several vibration generators A, B, C, D, E producing the same frequency vibratory motions with the same intensity (amplitude) along tube 11, FIG. 2, and by controlling phase relationship between these generators by phase controller 12. Mechanical phase controller 12 as shown in FIG. 2 can be used for generating low frequency traveling waves. It can be fashioned, e.g., as a driving shaft connecting and driving cam shafts A-E having angular shifts between them. If higher frequencies of the traveling waves were used, then both 12 and A-E can be electronic devices known in the art (e.g., piezo actuators for A-E and digital phase shifter for 12).

The tubular catalytic reactor shown in FIG. 1 benefits from being subjected to the traveling wave vibrations changing frictional conditions between the flowing fluid/gas medium and the internal walls of the tubular passage having the catalytic properties. For catalytic reactors comprising multiple capillary passages, or for porous catalyst-supporting structures typical for automotive catalytic converters, or for multi-groove reactor plates typical for fuel cells (e.g., see J. Larminie, A. Dicks, "Fuel Cell Systems Explained", John Wiley & Sons, 2001), generating wave motions of the passage walls becomes difficult, impractical, or impossible. Due to relatively small dimensions of the passages as well as due to high rigidity of the catalyst-supporting structures, the flow-to-wall friction reduction is easier to attain by application of very high frequency, i.e. ultrasonic, vibrations.

It is known that the friction at the interface fluid/gas medium—rigid wall in capillaries and/or pores can be reduced both by longitudinal ultrasonic vibrations of the passage walls and by transverse vibrations of the structure containing the flow.

If the flowing substance is a fluid, it was observed that the similar effect can be generated by exciting the flowing fluid itself with ultrasonic vibrations, thus creating high frequency variations of the flow velocity.

Figure 3:
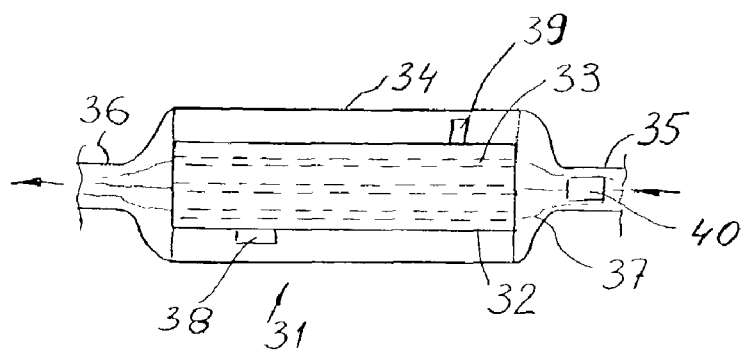
FIG. 3 illustrates a possible placement of generators of mechanical ultrasonic vibrations in relation to a catalytic reactor.

FIG. 3 shows catalytic reactor 31 shaped as an automotive catalytic converter. Catalyst-supporting structure 32 has numerous capillary passages 33 containing the catalyst and is packaged in housing 34 having inlet 35 and outlet 36 for flowing substance 37. Three ultrasonic generators (exciters) 38, 39, and 40 are shown in FIG. 3. Ultrasonic (e.g., piezoelectric or magnetostrictive) generators 38, 39 excite catalyst-supporting structure 32 in longitudinal and transverse directions, respectively. Generator 40 excites ultrasonic vibrations (velocity variations) of the flowing substance itself. Depending on the specific needs for a given application, a larger or fewer number of ultrasonic generators can be used. At least some generators can be placed at a distance from the catalyst-supporting structure and be connected with it by waveguides (not shown), e.g. for protecting the generators from high temperatures in the vicinity of the reactor. The waveguides can be made from a high temperature-resistant and/or low thermal conductivity material.

If more than one generator is used, they can be tuned to generate ultrasonic vibrations of the same or different frequencies, directions, and amplitudes. Optimization conditions for the vibratory environment depend on dimensions, structural materials, design specifics of the catalytic reactors as well as on the reacting (flowing) substances. The optimization of the tuning can be effected by a "trial and error" procedure unless an analytical technique is developed. Still, a significant effect can be attained if ultrasonic vibrations in the 15-100 KHz frequency range are used.

Special cases of generating the mechanical vibratory field inside a catalytic reactor include using only one generator 38, 39, or 40 in FIG. 3, or two generators 38 and 39 generating the same frequency vibrations and thus creating a vector of vibration intensity directed at an angle with the longitudinal axes of the flow passages.

It is readily apparent that the components of catalytic reactors with applied mechanical vibratory field, disclosed herein, may take a variety of configurations. Thus, the embodiments and exemplifications shown and described herein are meant for illustrative purposes only and are not intended to limit the scope of the present invention, the true scope of which is limited solely by the claims appended thereto.

The invention claimed is:

1. A catalytic reactor for intensification of reactions between specified reacting substances, comprising:
    a catalyst supporting structure having small cross sectional area passages for flow of at least one of said reacting substances, with the catalytic material being attached to internal wall surfaces of said passages and interfacing with said reacting substances; and
    a plurality of mechanical vibration exciters coupled to said catalyst-supporting structure, wherein the contact areas between said catalytic material and said reacting substances are subjected to intentionally generated mechanical vibratory motions caused by said exciters.

2. The catalytic reactor of claim 1, wherein said mechanical vibration exciters generate traveling waves along said wall surfaces of said passages.

3. The catalytic reactor of claim 1, wherein said mechanical vibration exciters generate a single frequency.

4. The catalytic reactor of claim 1, wherein said mechanical vibration exciters generate more than one frequency.

5. The catalytic reactor of claim 1, wherein at least one exciter generating said mechanical vibratory motions is placed outside said catalytic reactor and is coupled to said catalytic reactor by a waveguide.

6. The catalytic reactor of claim 1, wherein said ultrasonic mechanical vibratory motions have both longitudinal and transverse components in relation to flows of said reacting substances.

7. The catalytic reactor of claim 1, wherein said intentionally generated mechanical vibratory motions are of ultrasonic frequency in the range between 15 and 100 KHz.

8. The catalytic reactor of claim 7, wherein said mechanical vibratory motions of ultrasonic frequency are intentionally generated ultrasonic variations of the flow velocity of at least one of said reacting substances.

9. The catalytic reactor of claim 1, wherein at least one exciter generating said mechanical vibratory motions is placed outside said catalytic reactor and coupled to said catalytic reactor by a driving shaft oriented perpendicular to said catalyst supporting structure.

10. The catalytic reactor of claim 1, wherein:
    said plurality of exciters generating said mechanical vibratory motions are placed outside said catalytic reactor and coupled to said catalytic reactor by a respective driving shaft oriented perpendicular to said catalyst supporting structure; and
    a mechanical phase controller operative to control said driving shafts so as to induce a traveling wave along said wall surfaces of said passages.

11. The catalytic reactor of claim 1, wherein:
    said plurality of exciters generating said mechanical vibratory motions are placed outside said catalytic reactor and coupled to said catalytic reactor by a respective piezoelectric actuator; and
    a digital phase shifter operative to control said piezoelectric actuators so as to induce a traveling wave along said wall surfaces of said passages.

12. The catalytic reactor of claim 1, wherein said catalyst supporting structure comprises a tubular catalytic reactor.

* * * * *